(12) United States Patent
Bar-Haim et al.

(10) Patent No.: US 11,989,513 B2
(45) Date of Patent: May 21, 2024

(54) QUANTITATIVE COMMENT SUMMARIZATION

(71) Applicant: International Business Machines Corporation, Armonk, NY (US)

(72) Inventors: Roy Bar-Haim, Tel Aviv (IL); Lilach Eden, Haifa (IL); Yoav Kantor, Haifa (IL); Noam Slonim, Beit HaKerem (IL)

(73) Assignee: International Business Machines Corporation, Armonk, NY (US)

( * ) Notice: Subject to any disclaimer, the term of this patent is extended or adjusted under 35 U.S.C. 154(b) by 564 days.

(21) Appl. No.: 17/240,550

(22) Filed: Apr. 26, 2021

(65) Prior Publication Data

US 2022/0343073 A1    Oct. 27, 2022

(51) Int. Cl.
*G06F 40/279*    (2020.01)

(52) U.S. Cl.
CPC .................. *G06F 40/279* (2020.01)

(58) Field of Classification Search
CPC ...................................... G06F 40/279
USPC ............................................. 704/9
See application file for complete search history.

(56) References Cited

U.S. PATENT DOCUMENTS

| | | |
|---|---|---|
| 7,366,711 B1 | 4/2008 | McKeown et al. |
| 2010/0125484 A1 | 5/2010 | Chen et al. |
| 2017/0068975 A1 | 3/2017 | Parveen et al. |
| 2018/0260860 A1 | 9/2018 | Devanathan et al. |

OTHER PUBLICATIONS

Authors et. al.: Disclosed Anonymously, "A method of Visually Analyzing and Comparing Complex Opinions", An IP.com Prior Art Database Technical Disclosure, Jun. 7, 2010, 8 pages.
Egan, Charlie et al., "Summarising the points made in online political debates", Proceedings of the 3rd Workshop on Argument Mining, Aug. 7-12, 2016, 10 pages.
Ganesan, Kavita et al., "Opinosis: A Graph Based Approach to Abstractive Summarization of Highly Redundant Opinions", Proceedings of the 23rd International Conference on Computational Linguistics (Coling 2010), Aug. 2010, 9 pages.
Wang, Dingding et al., "SumView: A Web-based engine for summarizing product reviews and customer opinions", Expert Systems with Applications, Jan. 2013, 7 pages.
Peter Mell et al., "The NIST Definition of Cloud Computing—Recommendation of the National Institute of Standards and Technology", U.S. Department of Commerce, NIST Special Publication 800-145, Sep. 2011, 7 pages.

(Continued)

*Primary Examiner* — Thierry L Pham
(74) *Attorney, Agent, or Firm* — Stosch Sabo

(57) ABSTRACT

A computing system, computer program product, and computer-implemented method for quantitative comment summarization are provided. The method includes receiving a collection of comments, identifying a set of candidate key points corresponding to the collection of comments, and selecting a subset of key points from the set of candidate key points, wherein the selected subset of key points includes key points that are most salient in the collection of comments. The method also includes automatically mapping each comment within the collection of comments to any corresponding key points within the subset of key points based on a match score between each comment and key point pair, as well as generating a summary including the subset of key points and an absolute number or percentage of the comments mapped to each key point.

20 Claims, 5 Drawing Sheets

(56) References Cited

OTHER PUBLICATIONS

Agrawal, D., (2020) "The next generation of NLP: how new capabilities empower businesses to make data-informed decisions," https://www.ibm.com/blog/the-next-generation-of-nlp-how-new-capabilities-empower-businesses-to-make-data-informed-decisions/ <Retrieved Feb. 16, 2024>.

Ajjour, Y. et al. 2019. Modeling Frames in Argumentation. In Proceedings of the 2019 Conference on Empirical Methods in Natural Language Processing and the 9th International Joint Conference on Natural Language Processing (EMNLP-IJCNLP), pp. 2922-2932, Hong Kong, China. Association for Computational Linguistics. https://aclanthology.org/D19-1290.

Blei, D.M. et al. (2003). Latent dirichlet allocation. J. Mach. Learn. Res. 3, null (Mar. 1, 2003), 993-1022. https://dl.acm.org/doi/pdf/10.5555/944919.944937.

Christensen, J. et al. (Jun. 2013). Towards Coherent Multi-Document Summarization. In L. Vanderwende, H. Daume III, & K. Kirchhoff (Eds.), Proceedings of the 2013 Conference of the North American Chapter of the Association for Computational Linguistics: Human Language Technologies (pp. 1163-1173). Retrieved from https://aclanthology.org/N13-1136.

Deerwester, S.C., et al. (1990), Indexing by latent semantic analysis. J. Am. Soc. Inf. Sci., 41: 391-407. https://doi.org/10.1002/(SICI)1097-4571(199009) 41:6<391::AID-ASI1>3.0.CO;2-9.

Erkan, G. et al. 2004. LexRank: graph-based lexical centrality as salience in text summarization. J. Artif. Int. Res. 22, 1 (Jul. 2004), 457-479. https://dl.acm.org/doi/10.5555/1622487.1622501.

Grace Period Disclosure: Bar-Haim, R., Eden, L., Friedman, R., Kantor, Y., Lahav, D., & Slonim, N. (May 4, 2020). "From Arguments to Key Points: Towards Automatic Argument Summarization." https://arxiv.org/abs/2005.01619.

Grace Period Disclosure: Bar-Haim, R., Kantor, Y., Eden, L., Friedman, R., Lahav, D., & Slonim, N. (Oct. 11, 2020). "Quantitative Argument Summarization and Beyond: Cross-Domain Key Point Analysis." https://arxiv.org/abs/2010.05369.

Hoffman, T. (1999) Probabilistic Latent Semantic Analysis. arXiv [Cs.LG]. Retrieved from http://arxiv.org/abs/1301.6705.

Hu, M. et al. 2004. Mining and summarizing customer reviews. In Proceedings of the tenth ACM GIGKDD international conference on Knowledge discovery and data mining (KDD '04). Association for Computing Machinery, New York, NY, USA, 168-177. https://doi.org/10.1145/1014052.1014073.

Liu*, P. J., et al. (2018). Generating Wikipedia by Summarizing Long Sequences. International Conference on Learning Representations. Retrieved from https://openreview.net/forum?id=Hyg0vbWC-.

McKeown, K.R. et al. 2002. Tracking and summarizing news on a daily basis with Columbia's Newsblaster. In Proceedings of the second international conference on Human Language Technology Research (HLT '02). Morgan Kaufmann Publishers Inc., San Francisco, CA, USA, 280-285.

Misra, A. et al. 2016. Measuring the Similarity of Sentential Arguments in Dialogue. In Proceedings of the 17th Annual Meeting of the Special Interest Group on Discourse and Dialogue, pp. 276-287, Los Angeles. Association for Computational Linguistics. https://aclanthology.org/W16-3636.

Reimers, N. et al. 2019. Classification and Clustering of Arguments with Contextualized Word Embeddings. In Proceedings of the 57th Annual Meeting of the Association for Computational Linguistics, pp. 567-578, Florence, Italy. Association for Computational Linguistics. https://aclanthology.org/P19-1054.

Snyder, B. et al. 2007. Multiple Aspect Ranking Using the Good Grief Algorithm. In Human Language Technologies 2007: The Conference of the North American Chapter of the Association for Computational Linguistics; Proceedings of the Main Conference, pp. 300-307, Rochester, New York. Association for Computational Linguistics. https://aclanthology.org/N07-1038.

Titov, I. et al. 2008. A Joint Model of Text and Aspect Ratings for Sentiment Summarization. In Proceedings of ACL-08: HLT, pp. 308-316, Columbus, Ohio. Association for Computational Linguistics. https://aclanthology.org/P08-1036.

Algorithm 1 Key Point Selection
Input: Comments $C$, KP Candidates $K$, Threshold $t$
Output: A ranked subset of $K$

```
1:  procedure SELECT_KEY_POINTS(C, K, t)
2:      k_to_c ← Get_Matches(C, K, t)
3:      K ← sort_descending(keys of k_to_c) by #matches
4:      R ← []
5:      for k1 in K do
6:          for k2 in K up to and excluding k1 do
7:              s ← Avg(Score(k1, k2), Score(k2, k1))
8:              if s > t then
9:                  add k1 ∪ k_to_c[k1] to R
10:                 remove k1 from k_to_c
11:                 break
12:             end if
13:         end for
14:     end for
15:     kps ← keys of k_to_c
16:     kp_to_c ← k_to_c ∪ Get_Matches(R, kps, t)
17:     return sort_descending(keys of kp_to_c) by #matches
18: end procedure
19:
20: procedure GET_MATCHES(C, K, t)
21:     k_to_c ← { }
22:     for c in C do
23:         match_c ← argmax_{k∈K} Score(c, k)
24:         if Score(c, match_c) > t then
25:             add c to k_to_c[match_c]
26:         end if
27:     end for
28:     return k_to_c
29: end procedure
```

FIG. 2

QUANTITATIVE COMMENT SUMMARIZATION

BACKGROUND

The present disclosure relates to the field of textual summarization. More specifically, the present disclosure relates to automatic, quantitative comment summarization for textual collections including large volumes of comments.

SUMMARY

According to an embodiment described herein, a method is provided for quantitative comment summarization. The method includes receiving a collection of comments and identifying a set of candidate key points corresponding to the collection of comments. The method also includes selecting a subset of key points from the set of candidate key points, wherein the selected subset of key points includes key points that are most salient in the collection of comments, as well as automatically mapping each comment within the collection of comments to any corresponding key points within the subset of key points based on a match score between each comment and key point pair. The method further includes generating a summary including the subset of key points and an absolute number or percentage of the comments mapped to each key point.

In another embodiment, a computing system is provided. The computing system includes an interface for receiving a collection of comments. The computing system also includes a processor and a computer-readable storage medium. The computer-readable storage medium stores program instructions that direct the processor to identify a set of candidate key points corresponding to the collection of comments and to select a subset of key points from the set of candidate key points, wherein the selected subset of key points includes key points that are most salient in the collection of comments. The computer-readable storage medium also stores program instructions that direct the processor to automatically map each comment within the collection of comments to any corresponding key points within the subset of key points based on a match score between each comment and key point pair. The computer-readable storage medium further stores program instructions that direct the processor to generate a summary including the subset of key points and an absolute number or percentage of the comments mapped to each key point.

In yet another embodiment, a computer program product is provided. The computer program product includes a computer-readable storage medium having program instructions embodied therewith, wherein the computer-readable storage medium is not a transitory signal per se. The program instructions are executable by a processor to cause the processor to access a collection of comments and identify a set of candidate key points corresponding to the collection of comments. The program instructions are also executable by the processor to cause the processor to select a subset of key points from the set of candidate key points, wherein the selected subset of key points includes key points that are most salient in the collection of comments. The program instructions are further executable by the processor to cause the processor to automatically map each comment within the collection of comments to any corresponding key points within the subset of key points based on a match score between each comment and key point pair, as well as to generate a summary including the subset of key points and an absolute number or percentage of the comments mapped to each key point.

BRIEF DESCRIPTION OF THE SEVERAL VIEWS OF THE DRAWINGS

FIG. 2 is exemplary pseudocode for key point selection according to the quantitative comment summarization techniques described herein;

DETAILED DESCRIPTION

Figure 1:
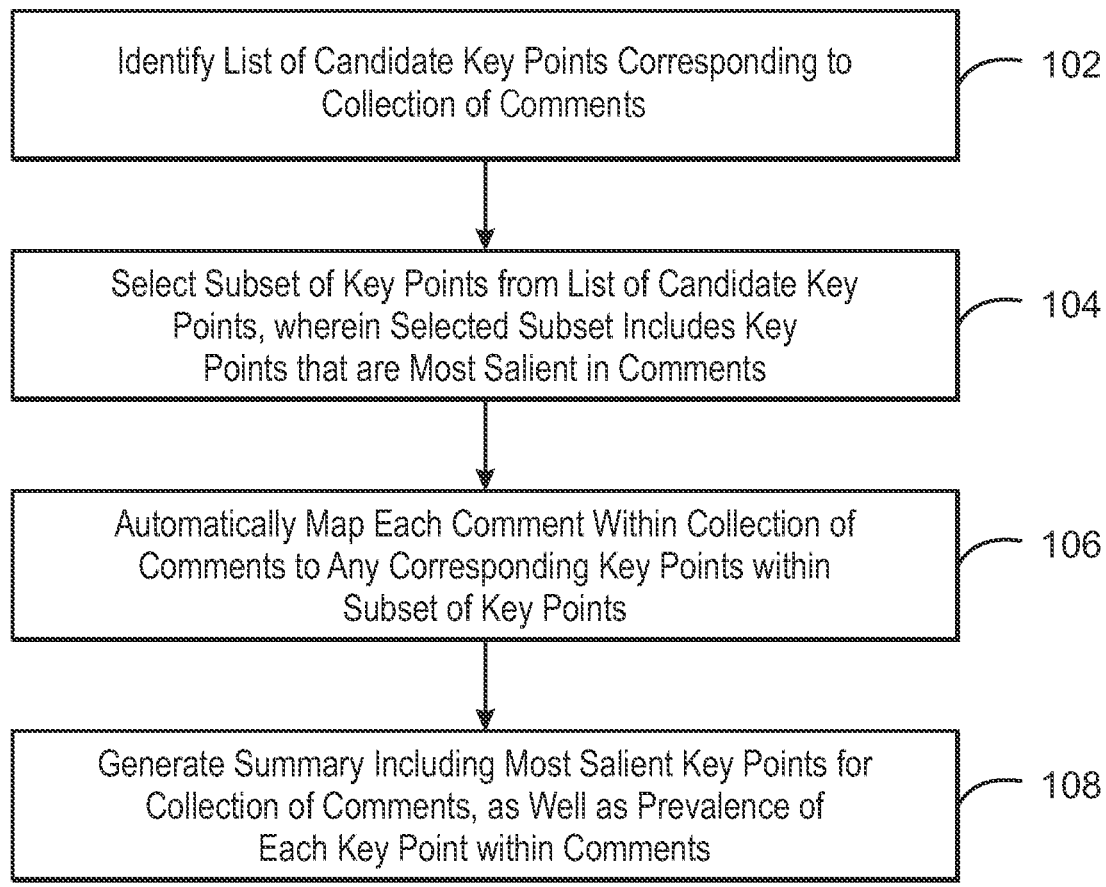
FIG. 1 is a process flow diagram of a method for quantitative comment summarization via automatic comment-to-key point mapping according to embodiments described herein.

The need for summarizing data corresponding to views, arguments, and opinions on a given topic is common to many text analytics or summarization applications across a variety of domains. Some prominent examples of this type of data are arguments within a debate/argumentation context, responses to open-ended questions in surveys, user reviews or customer feedback on products and services, call transcripts relating to customer service or other similar scenarios, and posts in online discussion forums. In general, this type of data is provided as statements or utterances that express a view, argument, opinion, suggestion, question, or the like. According to embodiments described herein, such statements or utterances are collectively referred to as "comments".

In recent years, significant progress has been made in the field of argument mining, which involves the automatic identification and extraction of argumentative structures in text. Specifically, several techniques have been developed for topic-related argument mining from the internet or other massive corpora. Similarly, it is now commonplace for policymakers in governments and businesses to conduct large-scale surveys to collect arguments either supporting or contesting some proposal. However, each of the above methods may result in the collection of hundreds or thousands of comments per topic, making it nearly impossible for a human to effectively read and digest all the relevant information.

In general, it is desirable to compress and summarize such comments in a manner that allows the comments to be effectively sorted and analyzed within an acceptable amount of time. In practice, the compression of such comments into short summaries is dependent on the inherent redundancy of the comments. Ideally, a summary would contain the most prominent points discussed in the comments, where each point is a concise statement or proposition. Moreover, in many cases, it is desirable to quantify the prevalence of each of the points listed in the summary. For example, when analyzing the responses to a municipal survey, it would be_ desirable to let policymakers know that the point stating, "The city needs better public transportation," in the summary matches 10% of the comments, while the points stating, "Please consider increasing the number of parks and walking trails," and "Electric rates are too high," matches 4% and 2% of the comments, respectively. In addition, it is sometimes desirable to view the specific comments that were mapped to a specific point in the summary.

However, existing multi-document summarization techniques only partially address the above *desiderata*. Specifically, according to some existing multi-document summarization techniques, the task of multi-document summarization has been defined in natural language processing (NLP) literature as creating textual summaries that are both concise and comprehensive from multiple texts with a shared theme. However, such textual summaries focus on capturing the main points, but not the prevalence of each of the main points. Accordingly, such textual summaries lack a useful quantitative dimension that would allow the main points to be effectively analyzed and compared.

Other existing multi-document summarization techniques take an alternative, sentiment-based approach that is focused on identifying the main aspects discussed in user reviews, as well as the sentiment towards each of the main aspects. For example, a summary of user reviews on a specific smartphone model might include the overall sentiment towards its battery, screen, camera, and the like. However, while this sentiment-based approach is suitable for summarizing user reviews conducted using generalized terminology, it is generally not suitable for more detailed comments corresponding to other domains. Moreover, this type of approach does not provide any explanation or justification for the sentiment towards each of the identified main aspects. Therefore, the resulting summaries are of limited value.

Other existing multi-document summarization techniques utilize clustering methods to analyze textual collections. In general, such techniques involve the generation of clusters of comments, where the comments within each cluster are assumed to be similar. However, clustering by itself does not provide any sort of textual summary, and the clusters do not necessarily correspond to the main points raised in the comments. In addition, such techniques face significant challenges in determining an appropriate number of clusters and defining the similarity metric for each particular application.

Furthermore, other existing multi-document summarization techniques utilize topic modeling, which is an unsupervised learning approach for discovering the latent semantic structures of textual collections. More specifically, topic modeling techniques represent each textual collection as a mixture of topics and each topic as a mixture of words. However, this bag-of-words representation of topics does not capture key statements or accurately measure the prevalence of such statements.

Therefore, existing multi-document summarization techniques clearly fail to provide summaries that efficiently identify and quantify comments within textual collections. Accordingly, the present disclosure describes improved techniques for automatic, quantitative comment summarization via cross-domain key point analysis. More specifically, the present disclosure describes techniques that allow large collections of comments across a variety of domains to be automatically summarized and quantified based on automatic comment-to-key point mapping. In various embodiments, this is accomplished by identifying a list of candidate key points corresponding to a collection of comments, where the term "key point" is used herein to refer to a concise statement or sentence that represents one of the main points covered by a particular set of comments. A subset of key points is then selected from the list of candidate key points, where the selected subset of key points includes the key points that are the most salient in the comments. Each comment within the collection of comments is then automatically mapped to any corresponding key points within the subset of key points. This results in the generation of a summary including the most salient key points for the collection of comments, as well as the prevalence of each key point within the comments, as evidenced by the absolute number or percentage of matching comments. In other words, the overall goal is to identify a short list of key points that achieves high coverage of the comments, as well as to generate a summary of the key points that provides a hierarchical organization of the comments. Moreover, in some embodiments, each key point may be directly linked to its matching comments, and the matching comments for each key point may be sorted by their respective matching score or argumentative quality score.

The quantitative comment summarization techniques described herein provide a number of useful advances in the textual summarization field. Specifically, the present techniques provide for the direct mapping of specific comments to corresponding key points, thus allowing for the generation of summaries with a quantitative component. In addition, the present techniques induce a semantic structure over the comments, thus allowing the comments to be efficiently sorted, compared, and analyzed. Moreover, the present techniques are amenable to accurate performance evaluations based on two clear, simple measures: (1) the coverage of the key points (i.e., the fraction of the comments that were mapped to at least one key point); and (2) the mapping precision (i.e., the fraction of the comments that were correctly mapped to at least one key point).

FIG. 1 is a process flow diagram of a method 100 for quantitative comment summarization via automatic comment-to-key point mapping according to embodiments described herein. In various embodiments, the method 100 is implemented by a computing system, such as the computing system 300 described with respect to FIG. 3. In particular, the method 100 may be performed by one or more processors via the execution of one or more modules stored within one or more computer-readable storage media, as described further with respect to FIG. 3.

According to embodiments described herein, a collection of comments is provided as the input to the method 100. In some embodiments, the collection of comments may correspond to a particular topic within a particular domain. For example, the comments may include, but are not limited to, arguments provided within a debate/argumentation context, responses to open-ended questions in surveys, user reviews or customer feedback on products and services, call transcripts relating to customer service or other similar scenarios, or posts in online discussion forums. Furthermore, according to embodiments described herein, each comment may include a particular statement or utterance that expresses a view, argument, opinion, suggestion, question, or the like, optionally corresponding to the particular topic within the particular domain. For example, if the domain includes human debate, each comment may include an argument either for or against the topic statement given for the debate. As another example, if the domain includes an online discussion forum, each comment may include a view or opinion relating to the current topic being discussed within the forum.

Given the collection of comments as input, the method 100 begins at block 102 with the identification of a list of candidate key points corresponding to the collection of comments. In various embodiments, this may be accomplished by analyzing the collection of comments to extract sentences that are short and have high argumentative quality. More specifically, concise, high-quality candidate key points may be identified by considering only single sentences and filtering out sentences with lengths exceeding a certain number of tokens. Moreover, in some embodiments, to ensure the high-quality and argumentative nature of the selected comments, a machine learning model trained on a large-scale dataset for argument quality ranking, such as the publicly-available IBM-Rank-30k Dataset (which includes around 30,000 arguments annotated for point-wise quality to train an argument quality ranking model), is used to compute the argument quality score for each candidate key point and to provide only high-quality candidate key points as output. Furthermore, candidate key points that encompass sentences starting with pronouns may be filtered out to keep the key points self-contained. In various embodiments, the resulting list of candidate key points include high-level statements or sentences that are general enough to match a significant portion or percentage of the comments, yet informative enough to provide a useful summary of the comments.

In some embodiments, the candidate key points are manually identified. For example, a domain expert may be able to quickly compile a list of candidate key points, optionally based on the particular topic within the particular domain. More preferably, in other embodiments, the identification of the candidate key points at block 102 is performed automatically using machine learning techniques. Such machine learning techniques may include, for example, supervised machine learning techniques, unsupervised machine learning techniques, natural language inference techniques, or any suitable combination thereof. For example, in some embodiments, the candidate key points are automatically identified, at least in part, using a supervised machine learning model trained on a large-scale dataset for argument quality ranking (or any other suitable dataset), as described above. Moreover, in various embodiments, using machine learning techniques to identify the candidate key points allows for the detection of new and/or unexpected key points, in addition to the expected or presupposed key points that would have been identified by a domain expert. Furthermore, in some embodiments, the identified list of candidate key points may be fine-tuned based on the details of each particular implementation, regardless of whether the list was automatically or manually generated.

Once the list of candidate key points has been identified, the method proceeds to block 104. At block 104, a subset of key points is selected from the list of candidate key points, wherein the selected subset includes the key points that are most salient in the comments. The subset of key points may include a relatively small number of key points, such as, for example, around 5-10 key points, although the exact number may vary considerably depending on the details of the specific implementation. However, it should be noted that, in general, a relatively small number of key points is sufficient for covering the vast majority of the comments on a particular topic.

According to embodiments described herein, the subset of key points may be selected using a key point selection algorithm that is based on comment-to-key point mapping. In various embodiments, this comment-to-key point mapping is accomplished using a matcher component or "matcher" machine learning model that receives comment and key point pairs and then returns match scores for each comment and key point pair, where a high match score means that the key point captures the gist of the comment or, in other words, that the key point is directly supported by a point made in the comment.

In various embodiments, the matcher machine learning model is trained using a large-scale labeled dataset for argument-to-key point mapping. One such dataset, which is referred to as the ArgKP Dataset, includes around 24,000 argument and key point pairs for 28 controversial topics. Notably, although this dataset relates specifically to arguments, the use of this type of dataset is not limited to applications within the debate/argumentation domain but, rather, can also be applied to any domain that encompasses the broader category of comments, as described herein. In other words, a matcher machine learning model trained on this type of large-scale labeled dataset for argument-to-key point mapping can perform well across a wide range of topics and domains (i.e., on topics and domains that are not covered by the dataset itself), without using any additional topic-specific or domain-specific labeled data for training the matcher machine learning model. For example, the matcher machine learning model provided herein has been successfully applied to municipal surveys and user reviews without using any labeled data relating specifically to the survey domain or the user review domain, respectively.

Within the ArgKP Dataset, each argument and key point pair is labeled as matching or non-matching. Given a set of key points for a topic, an argument can be mapped to one or more key points, or to none of them. Moreover, the arguments within the ArgKP Dataset are a subset of the larger IBM-Rank-30k Dataset, which contains 71 topics, with stance and argument quality annotations for each argument.

Furthermore, in other embodiments, the matcher machine learning model is trained using a domain-specific and/or topic-specific labeled dataset, rather than the large-scale labeled dataset for argument-to-key point mapping. For example, the matcher machine learning model may be trained using a smaller-scale labeled dataset including comments within the target domain and (optionally) including annotations regarding suitable key point candidates.

Using the large-scale dataset for argument-to-key point mapping (or any other suitable labeled dataset) as the training dataset, the matcher machine learning model can then be generated using supervised machine learning techniques. In addition, in some embodiments, transfer learning techniques from the related task of natural language inference (NLI) (or textual entailment) may be utilized. Alternatively, the matcher machine learning model can be implemented using unsupervised machine learning techniques, which do not require any labeled training data. An example of a supervised machine learning technique that may be used includes fine-tuning any suitable pretrained model (such as, for example, BERT XLNet, RoBERTa, or ALBERT) to predict matches between argument and key point pairs within the ArgKP Dataset (or any other suitable large-scale labeled dataset for comment-to-key point mapping). In some embodiments, such a pretrained model may be fine-tuned using the HuggingFace transformers framework, although any other suitable framework may also be used. Moreover, for embodiments in which NLI transfer learning techniques are used, any suitable pretrained model may be fine-tuned using a large-scale NLI dataset (such as, for example, the Stanford (SNLI) or the Multi-Genre (MNLI) dataset, which each include hundreds of thousands of labeled premise-hypothesis pairs). Examples of unsupervised machine learning techniques that may be used include Term Frequency—

Inverse Document Frequency (TF-IDF) techniques and word embedding techniques. For embodiments in which TF-IDF techniques are used, the comments and key points may be represented as TF-IDF weighted word vectors, and the cosine similarities between the vectors may then be used as the match scores for the comment and key point pairs. For embodiments in which word embedding techniques are used, a context independent word embedding model (e.g., the word2vec model or the Global Vectors (GloVe) model) may be used to compute embeddings for individual words corresponding to the comments and key points, or a contextualized embedding pretrained model (e.g., the BERT model) may be used to compute embeddings for entire sentences corresponding to the comments and key points. The word embeddings of each text may be aggregated (e.g., by taking their average) to form a text embedding vector, and the cosine similarities between the resulting text embedding vectors may then be used as the match scores for the comment and key point pairs.

In various embodiments, once the matcher machine learning model has been generated, a selection policy may be used to determine how to map a comment to one or more key points based on the match scores output by the matcher machine learning model. Examples of suitable selection policies that may be used include the threshold selection policy, the best match selection policy, the best match plus threshold selection policy, and the dual threshold selection policy. Moreover, this matching process may be performed locally by treating each comment and key point par individually, or it may be performed globally by examining all possible key points for each comment.

For embodiments in which the threshold selection policy is used, each argument (or comment) is mapped to all key points with a match score that exceeds a specified threshold for the minimum allowable match score to determine a match. In some embodiments, this specified threshold is learned from a development dataset. In addition, in some embodiments, this specified threshold may be modified or finetuned based on a tradeoff between the precision and the coverage that may be obtained. In particular, setting a higher specified threshold will generally result in a higher level of precision, meaning that a higher percentage of the mappings were correct. Conversely, setting a lower specified threshold will generally result in a higher level of coverage, meaning that a higher percentage of the overall comments were mapped.

For embodiments in which the best match selection policy is used, each comment is mapped to the key point with the highest match score. More specifically, each comment is mapped to the best matching key point by considering all key points for the same topic and stance as candidates and determining only the key point with the highest match as matched to the comment, while all the other key points are determined to be unmatched. It should be noted that the best match selection policy is a fully unsupervised selection policy since it does not require labeled data for learning the specified threshold.

For embodiments in which the best match plus threshold selection policy is used, each comment is mapped to the key point with the highest match score, if the match score is above the specified threshold. In other words, the best match plus threshold selection policy is a combination of the threshold selection policy and the best match policy that allows the best matching key point for a comment to be considered a match only if the match score exceeds the specified threshold. In general, using the best match plus threshold selection policy controls the tradeoff between precision and coverage by ensuring that as many comments as possible are mapped, while still maintaining a certain degree of precision that is defined by the specified threshold. Moreover, as opposed to the best match selection policy, the best match plus threshold selection policy helps to prevent weak matches by allowing comments to be mapped to zero key points if the match scores do not exceed the specified threshold. This is useful since, in practice, it is not uncommon to find that around 20-30% of the comments within a particular collection of comments do not match any of the key points.

For embodiments in which the dual threshold selection policy is used, comments with more than one matching key point are accounted for by learning two thresholds. Specifically, if two key points exceed the specified lower threshold and at least one of them exceeds a specified upper threshold, both will be matched. Otherwise, the dual threshold selection policy works the same as the best match plus threshold selection policy by using only the specified lower threshold. Therefore, the dual threshold selection policy allows for zero to two matches per comment.

Turning now to the details of block 104 of the method 100, the subset of key points may be selected by performing the following steps. First, each comment is mapped to one or more matching key points, if any exist, using the matcher machine learning model in conjunction with a specified selection policy. For example, in some embodiments, the best match plus threshold selection policy is used. In such embodiments, each comment is mapped to its best matching key point or, in other words, to the key point with the highest match score, as long as the match score is above the specified threshold for the minimum allowable match score to determine a match. In addition, in various embodiments, each candidate key point is mapped to any other matching candidate key points in the same manner. Second, the key points are ranked in descending order according to the number of matching comments or, in other words, based on each key point's degree of coverage of the overall collection of comments. Third, to avoid redundancy, any key points that are too semantically similar to a higher-ranking key point (as indicated by the match score between the key points) are removed from the list of candidate key points. The removed key points and their matching comments are then mapped to the remaining list of candidate key points. Fourth, the remaining candidate key points are resorted (or ranked) based on the updated number of matching comments, and a specified number of highest-ranking candidate key points are selected as the subset of key points that are most salient in the comments.

At block 106, each comment within the collection of comments is automatically mapped to any corresponding key points within the subset of key points. According to embodiments described herein, this automatic comment-to-key point mapping is performed in a similar manner as the matching process described with respect to block 104. However, at block 106, the comments are remapped to only the key points within the subset of key points, rather than to the entire list of candidate key points. In various embodiments, this is accomplished via the matcher machine learning model using the best match plus threshold selection policy, as described with respect to block 104. However, those skilled in the art will appreciate that any other suitable selection policy may alternatively be used, depending on the details of the specific implementation.

At block 108, a summary including the most salient key points for the collection of comments, as well as the prevalence of each key point within the comments, is generated.

More specifically, the generated summary may include a list of the key point that were selected for the subset of key points at block 104, along with the absolute number of percentage of comments that were mapped to each key point at block 106. In this manner, the generated summary provides a concise overview of the distribution of the most relevant key points relating to a large collection of comments. Moreover, the generated summary is highly expressive, informative, transparent, and explainable since the key points represent high-quality, concise statements or sentences that represent the main points covered by the collection of comments. Accordingly, a user of the computing system may be able to gain a relatively in-depth understanding of all the main points covered by the collection of comments by viewing only the summary of key points.

Furthermore, in some embodiments, the generated summary links the matching comments to each key point. In this manner, the key points may effectively serve as queries for retrieving matching comments. In addition, in such embodiments, the generated summary may sort (or rank) the matching comments by their match score, argumentative quality score, and/or any other suitable metric or score related to the comments. Accordingly, in such embodiments, the user of the computing system may be able to gain an even more in-depth understanding of the range of statements or utterances covered by each key point. This is particularly useful for applications involving very large numbers of comments (e.g., thousands or potentially even hundreds of thousands of comments) since it is generally not feasible for a human reader to manually read and analyze such a vast quantity of comments within a reasonable amount of time.

Figure 3:
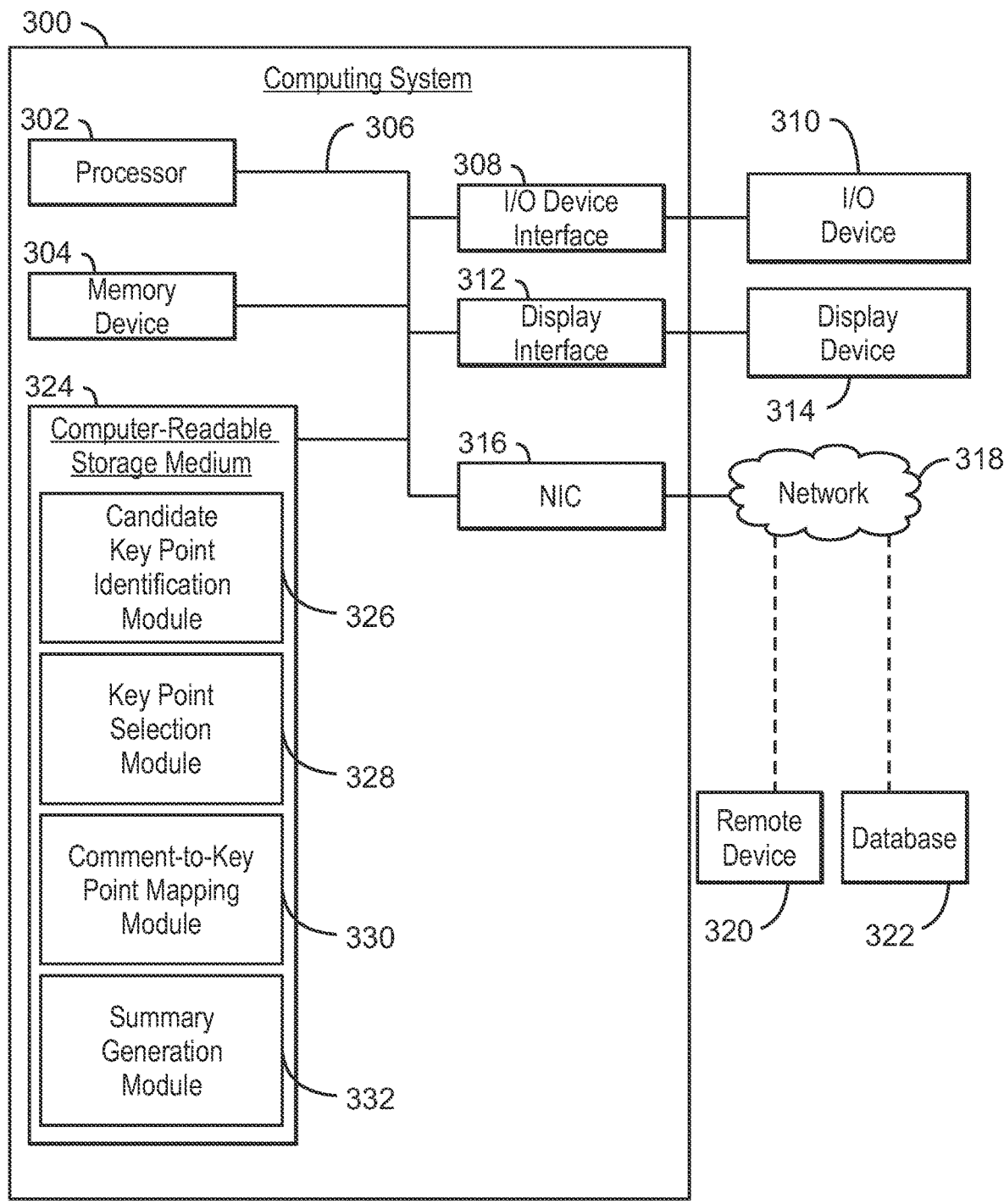
FIG. 3 is a simplified block diagram of an exemplary computing system that can be used to implement the quantitative comment summarization techniques described herein.

Those skilled in the art will appreciate that the summary may be visually presented to the user via a display device of the computing system (e.g., the display device 314 of the computing system 300 described with respect to FIG. 3) in any suitable manner. For example, in some embodiments, the summary may be presented in the form of a table or chart that lists the key points, along with the absolute number or percentage of the comments that were mapped to each key point. The list of key points may optionally be presented in descending order, e.g., from most salient to least salient, based on the absolute number or percentage of the comments that were mapped to each key point. In addition, the summary may optionally include more detailed information regarding the matching comments for each key point. For example, the summary may include an option to expand the view corresponding to an individual key point, at which point the user may be presented with a sorted list of matching comments for the key point. In some embodiments, the matching comments for the key point may be presented in descending order, e.g., from highest to lowest match score or highest to lowest argumentative quality score, for example. Furthermore, those skilled in the art will appreciate that any number of other representations, information, or metrics may be included within the summary, depending on the details of the particular implementation.

The block diagram of FIG. 1 is not intended to indicate that the blocks 102-108 of the method 100 are to be executed in any particular order, or that all of the blocks 102-108 of the method 100 are to be included in every case. Moreover, any number of additional blocks may be included within the method 100, depending on the details of the specific implementation.

FIG. 2 is exemplary pseudocode 200 for key point selection according to the quantitative comment summarization techniques described herein. In other words, the exemplary pseudocode 200 shown in FIG. 2 is used to select the subset of key points that are most salient in the comments from the list of candidate key points, as described with respect to block 104 of the method 100 for quantitative comment summarization. More specifically, given a set of comments, C, a set of key point candidates, K, and a specified threshold, t, the pseudocode outputs a sorted (or ranked) subset of selected key points. It should be noted that, according to the exemplary pseudocode 200 of FIG. 2, the best match plus threshold selection policy is used for mapping the comments to the key points. Furthermore, those skilled in the art will appreciate that the pseudocode 200 is provided for illustrative purposes only since, in practice, the key point selection process may be executed using any suitable variation of (or alternative to) the pseudocode 200 of FIG. 2.

FIG. 3 is a simplified block diagram of an exemplary computing system 300 that can be used to implement the quantitative comment summarization techniques described herein. The computing system 300 may include one or more servers, one or more general-purpose computing devices, one or more special-purpose computing devices, one or more virtual machines, and/or any other suitable type(s) of computing device(s). As an example, the computing system 300 may be a desktop computer, a laptop computer, a tablet computer, or a smartphone. Moreover, in some embodiments, the computing system 300 is a cloud computing node.

The computing system 300 includes a processor 302 that is adapted to execute stored program instructions, such as program modules, as well as a memory device 304 that provides temporary memory space for the program instructions during execution. The processor 302 can include any suitable processing unit or device, such as, for example, a single-core processor, a single-core processor with software multithread execution capability; a multi-core processor, a multi-core processor with software multithread execution capability, a computing cluster, parallel platforms, parallel platforms with shared memory, or any number of other configurations. Moreover, the processor 302 can include an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combinations thereof, designed to perform the functions described herein. The memory device 304 can include volatile memory components, nonvolatile memory components, or both volatile and nonvolatile memory components. Nonvolatile memory components may include, for example, read only memory (ROM), programmable ROM (PROM), electrically programmable ROM (EPROM), electrically erasable ROM (EEROM), flash memory, or nonvolatile random-access memory (RAM) (e.g., ferroelectric RAM (FeRAM). Volatile memory components may include, for example, RAM, which can act as external cache memory. RAM is available in many forms, such as, for example, synchronous RAM (SRAM), dynamic RAM (DRAM), synchronous dynamic RAM (SDRAM), and the like.

In some embodiments, the computing system 300 is practiced in a distributed cloud computing environment where tasks are performed by remote processing devices that are linked through a communications network. In a distributed cloud computing environment, program modules may be located in both local and remote computing devices.

The processor 302 is connected through a system interconnect 306 (e.g., PCI®, PCI-Express®, etc.) to an input/output (I/O) device interface 308 adapted to connect the computing system 300 to one or more I/O devices 310. The I/O devices 310 may include, for example, a keyboard and a pointing device, where the pointing device may include a touchpad or a touchscreen, among others. The I/O devices 310 may include built-in components of the computing system 300 and/or devices that are externally connected to the computing system 300.

The processor 302 is also linked through the system interconnect 306 to a display interface 312 adapted to connect the computing system 300 to a display device 314. The display device 314 may include a display screen that is a built-in component of the computing system 300. The display device 314 may also include a computer monitor, television, or projector, among others, that is externally connected to the computing system 300. In addition, a network interface controller (NIC) 316 is adapted to connect the computing system 300 through the system interconnect 306 to the network 318. In some embodiments, the NIC 316 can transmit data using any suitable interface or protocol, such as the internet small computer system interface, among others. The network 318 may be a cellular network, a radio network, a wide area network (WAN), a local area network (LAN), or the Internet, among others. The network 318 may include associated copper transmission cables, optical transmission fibers, wireless transmission devices, routers, firewalls, switches, gateway computers, edge servers, and the like.

One or more remote devices 320 may optionally connect to the computing system 300 through the network 318. In addition, one or more databases 322 may optionally connect to the computing system 300 through the network 318. In some embodiments, the one or more databases 322 store data relating to textual summarization and machine learning tasks. For example, the database(s) 322 may include data corresponding to large collections of comments related to various topics across a variety of domains, as well as data corresponding to a matcher machine learning model for performing automatic comment-to-key point mapping. In such embodiments, the computing system 300 may access or download at least a portion of the data corresponding to the comments and/or a portion of the data corresponding to the matcher machine learning model during the quantitative comment summarization process described herein.

The computing system 300 also includes a computer-readable storage medium (or media) 324 that includes program instructions that may be executed by the processor 302 to perform various operations, such as the quantitative comment summarization process described herein. The computer-readable storage medium 324 may be integral to the computing system 300, or the computer-readable storage medium 324 may be an external device that is connected to the computing system 300 when in use. The computer-readable storage medium 324 may include, for example, an electronic storage device, a magnetic storage device, an optical storage device, an electromagnetic storage device, a semiconductor storage device, or any suitable combination of the foregoing. A non-exhaustive list of more specific examples of the computer-readable storage medium 324 includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. Moreover, the term "computer-readable storage medium," as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. In some embodiments, the NIC 316 receives program instructions from the network 318 and forwards the program instructions for storage in the computer-readable storage medium 324 within the computing system 300.

Generally, the program instructions, including the program modules, may include routines, programs, objects, components, logic, data structures, and so on that perform particular tasks or implement particular abstract data types. For example, the program instructions may include assembler instructions, instruction-set-architecture (ISA) instructions, machine instructions, machine-dependent instructions, microcode, firmware instructions, state-setting data, or either source code or object code written in any combination of one or more programming languages, including an object-oriented programming language such as Smalltalk, C++, or the like, and conventional procedural programming languages, such as the "C" programming language or similar programming languages. The program instructions may execute entirely on the computing system 300, partly on the computing system 300, as a stand-alone software package, partly on the computing system 300 and partly on a remote computer or server connected to the computing system 300 via the network 318, or entirely on such a remote computer or server. In some embodiments, electronic circuitry including, for example, programmable logic circuitry, field-programmable gate arrays (FPGA), or programmable logic arrays (PLA) may execute the program instructions by utilizing state information of the program instructions to personalize the electronic circuitry, in order to perform aspects of the quantitative comment summarization techniques described herein.

According to embodiments described herein, the computer-readable storage medium 324 includes one or more program modules (and/or sub-modules) for performing the quantitative comment summarization process described herein. Specifically, the computer-readable storage medium 324 includes a candidate key point identification module 326 for identifying a list of candidate key points corresponding to a collection of comments, a key point selection module 328 for selecting a subset of key points that are most salient in the comments from the list of candidate key points, a comment-to-key-point mapping module 330 for automatically mapping each comment within the collection of comments to any corresponding key points within the subset of key points, and a summary generation module 332 for generating a summary including the most salient key points for the collection of comments, as well as the prevalence of each key point within the comments. Moreover, the manner in which each module may be executed to perform the quantitative comment summarization process described herein is described further with respect to FIG. 1.

It is to be understood that the block diagram of FIG. 3 is not intended to indicate that the computing system 300 is to include all of the components shown in FIG. 3. Rather, the computing system 300 can include fewer or additional components not illustrated in FIG. 3 (e.g., additional processors, additional memory components, embedded controllers, additional modules, additional network interfaces, etc.). Furthermore, any of the functionalities relating to the quantitative comment summarization process described herein are partially, or entirely, implemented in hardware and/or in the processor 302. For example, such functionalities may be implemented with an ASIC, logic implemented in an embedded controller, and/or in logic implemented in the processor 302, among others. In some embodiments, the functionalities relating to the quantitative comment summarization process described herein are implemented with logic, wherein the logic, as referred to herein, can include any suitable hardware (e.g., a processor, among others), software (e.g., an application, among others), firmware, or any suitable combination of hardware, software, and firmware.

The present techniques may be a computing system, a method, and/or a computer program product. The computer program product may include a computer-readable storage medium (or media) having computer-readable program instructions thereon for causing a processor to carry out aspects of the present techniques.

Aspects of the present techniques are described herein with reference to flowchart illustrations and/or block diagrams of methods, apparatus (systems), and computer program products according to embodiments of the present techniques. It will be understood that each block of the flowchart illustrations and/or block diagrams, and combinations of blocks in the flowchart illustrations and/or block diagrams, can be implemented by computer-readable program instructions.

The flowchart and block diagrams in the figures illustrate the architecture, functionality, and operation of possible implementations of systems, methods, and computer program products according to various embodiments of the present techniques. In this regard, each block in the flowchart or block diagrams may represent a module, segment, or portion of instructions, which includes one or more executable instructions for implementing the specified logical functions. In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special-purpose hardware-based systems that perform the specified functions or acts or carry out combinations of special-purpose hardware and computer instructions.

Figure 4:
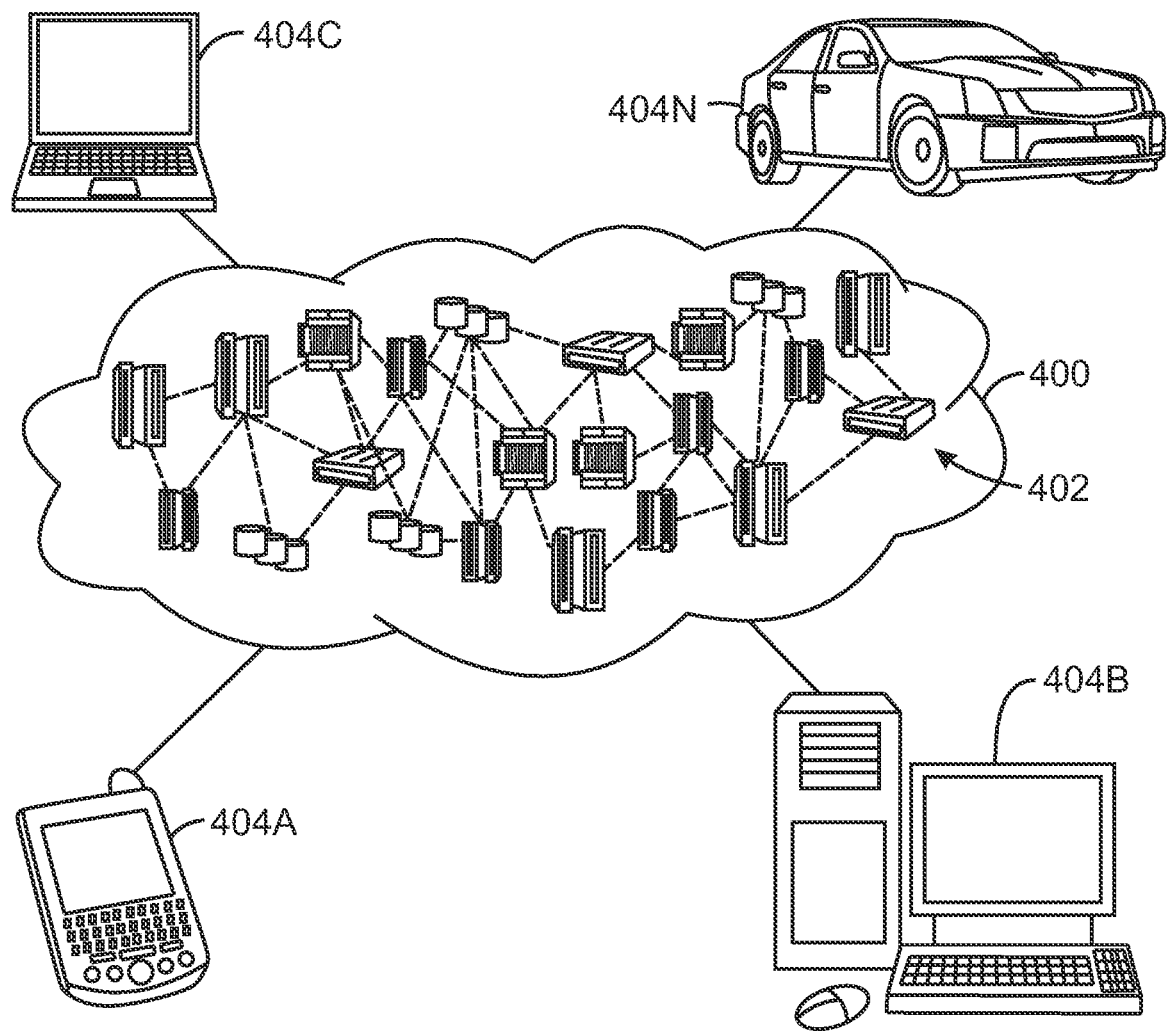
FIG. 4 is a schematic view of an exemplary cloud computing environment that can be used to implement the quantitative comment summarization techniques described herein.
Figure 5:
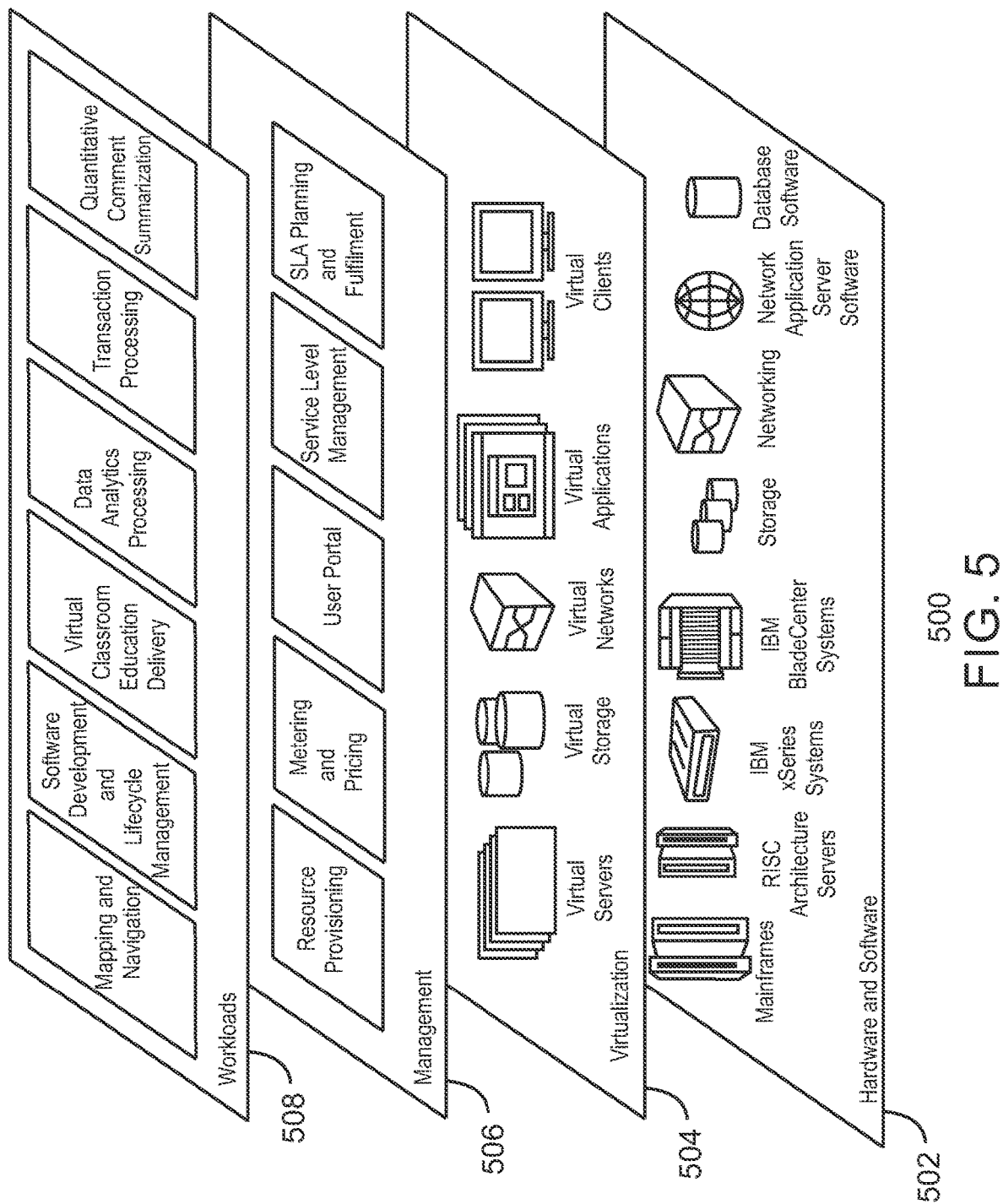
FIG. 5 is a simplified schematic view of exemplary functional abstraction layers provided by the cloud computing environment of FIG. 4 according to embodiments described herein.

In some scenarios, the quantitative comment summarization techniques described herein may be implemented in a cloud computing environment, as described in more detail with respect to FIGS. 4 and 5. It is understood in advance that although this disclosure may include a description of cloud computing, implementation of the techniques described herein is not limited to a cloud computing environment. Rather, embodiments of the present techniques are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing units, memory, storage devices, applications, virtual machines, and services) that can be rapidly provisioned and released with minimal management effort or interaction with a provider of the service. This cloud model may include at least five characteristics, at least three service models, and at least four deployment models.

The at least five characteristics are as follows:
(1) On-demand self-service: A cloud consumer can unilaterally provision computing capabilities, such as server time and network storage, as needed automatically without requiring human interaction with the service's provider.
(2) Broad network access: Capabilities are available over a network and accessed through standard mechanisms that promote use by heterogeneous thin or thick client platforms (e.g., mobile phones, laptops, and PDAs).
(3) Resource pooling: The provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).
(4) Rapid elasticity: Capabilities can be rapidly and elastically provisioned, in some cases automatically, to quickly scale out and rapidly released to quickly scale in. To the consumer, the capabilities available for provisioning often appear to be unlimited and can be purchased in any quantity at any time.
(5) Measured service: Cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

The at least three service models are as follows:
(1) Software as a Service (SaaS): The capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.
(2) Platform as a Service (PaaS): The capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.
(3) Infrastructure as a Service (IaaS): The capability provided to the consumer is to provision processing, storage, networks, and other fundamental computing resources, where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

The at least four deployment models are as follows:
(1) Private cloud: The cloud infrastructure is operated solely for an organization. It may be managed by the organization or a third party and may exist on-premises or off-premises.
(2) Community cloud: The cloud infrastructure is shared by several organizations and supports a specific community that has shared concerns (e.g., mission, security requirements, policy, and compliance considerations). It may be managed by the organizations or a third party and may exist on-premises or off-premises.
(3) Public cloud: The cloud infrastructure is made available to the general public or a large industry group and is owned by an organization selling cloud services.
(4) Hybrid cloud: The cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service-oriented with a focus on statelessness, low coupling, modularity, and semantic interoperability. At the heart of cloud computing is an infrastructure including a network of interconnected nodes.

FIG. 4 is a schematic view of an exemplary cloud computing environment 400 that can be used to implement the quantitative comment summarization techniques described herein. As shown, cloud computing environment 400 includes one or more cloud computing nodes 402 with which local computing devices used by cloud consumers, such as, for example, personal digital assistant (PDA) or cellular telephone 404A, desktop computer 404B, laptop computer 404C, and/or automobile computer system 404N may communicate. The cloud computing nodes 402 may communicate with one another. They may be grouped (not shown) physically or virtually, in one or more networks, such as Private, Community, Public, or Hybrid clouds as described hereinabove, or a combination thereof. This allows cloud computing environment 400 to offer infrastructure, platforms and/or software as services for which a cloud consumer does not need to maintain resources on a local computing device. It is understood that the types of computing devices 404A-N shown in FIG. 4 are intended to be illustrative only and that the cloud computing nodes 402 and cloud computing environment 400 can communicate with any type of computerized device over any type of network and/or network addressable connection (e.g., using a web browser).

FIG. 5 is a simplified schematic view of exemplary functional abstraction layers 500 provided by the cloud computing environment 400 shown in FIG. 4 according to embodiments described herein. It should be understood in advance that the components, layers, and functions shown in FIG. 5 are intended to be illustrative only and embodiments of the present techniques are not limited thereto. As depicted, the following layers and corresponding functions are provided.

Hardware and software layer 502 includes hardware and software components. Examples of hardware components include mainframes, in one example IBM® zSeries® systems; RISC (Reduced Instruction Set Computer) architecture-based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 504 provides an abstraction layer from which the following examples of virtual entities may be provided: virtual servers; virtual storage; virtual networks, including virtual private networks; virtual applications and operating systems; and virtual clients. In one example, management layer 506 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources include application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 508 provides examples of functionality for which the cloud computing environment may be utilized. Examples of workloads and functions which may be provided from this layer include: mapping and navigation; software development and lifecycle management; virtual classroom education delivery; data analytics processing; transaction processing; and executing quantitative comment summarization techniques.

The system(s), method(s), and computer program product(s) described herein provide a technical solution to the technical problem of accurately classifying and/or detecting target objects within images using a classification/detection model. This may be particularly useful in the application domain of identifying retail products in an image, such as, for example, identifying multiple instances of specific retail products on multiple shelves. In addition, the system(s), method(s), and computer program product(s) described herein improve the performance of a computing device that identifies target objects within images by reducing the data storage requirements and/or reducing the computational difficulty (in terms of processor utilization and/or processing time) for identifying such target objects. Furthermore, the system(s), method(s), and computer program product(s) described herein improve an underlying technical process within the field of image processing, in particular, within the field of automatic detection and recognition of target objects within images.

The system(s), method(s), and computer program product(s) described herein are tied to physical real-life components, including, for example, a camera that captures images and a data storage device that stores a repository of data relating to classification/detection models. Accordingly, the system(s), method(s), and computer program product(s) described herein are inextricably tied to computing technology and/or physical components to overcome an actual technical problem arising in the processing of digital images.

The descriptions of the various embodiments of the present techniques have been presented for purposes of illustration and are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for quantitative comment summarization, comprising:
   receiving a collection of comments;
   identifying a set of candidate key points corresponding to the collection of comments;
   selecting a subset of key points from the set of candidate key points, wherein the selected subset of key points comprises key points that are most salient in the collection of comments;
   automatically mapping each comment within the collection of comments to any corresponding key points within the subset of key points based on a match score between each comment and key point pair; and
   generating a summary comprising the subset of key points and an absolute number or percentage of the comments mapped to each key point.

2. The method of claim 1, comprising selecting the subset of key points from the set of candidate key points by:
   automatically mapping each comment within the collection of comments to any corresponding candidate key points based on a match score between each comment and candidate key point pair;
   automatically mapping each candidate key point to any other corresponding candidate key points based on a match score between each candidate key point pair;
   ranking the candidate key points in descending order according to a number of comments mapped to each candidate key point;
   removing any candidate key points that are mapped to a higher-ranking candidate key point if the match score between the candidate key point pair is above a specified threshold;
   automatically mapping removed candidate key points and comments that were mapped to a removed candidate key point to any corresponding remaining candidate key points based on a match score between each comment or removed candidate key point and remaining candidate key point pair;
   ranking the remaining candidate key points in descending order according to an updated number of comments mapped to each remaining candidate key point; and
   selecting a specified number of highest-ranking remaining candidate key points as the subset of key points that are most salient in the collection of comments.

3. The method of claim 1, comprising automatically mapping each comment within the collection of comments to any corresponding key points within the subset of key points by:
   determining the match score between each comment and key point pair using a matcher machine learning model; and
   mapping each comment to any corresponding key points based on the match score using a specified selection policy.

4. The method of claim 3, comprising generating the matcher machine learning model based on at least one of a supervised machine learning technique, an unsupervised machine learning technique, or a natural language inference technique.

5. The method of claim 3, wherein the specified selection policy comprises a best match plus threshold selection policy, and wherein the method comprises using the best match plus threshold selection policy to map each comment to any corresponding key points by mapping each comment to a key point with a highest match score, as long as the match score is above a specified threshold.

6. The method of claim 1, comprising automatically identifying the set of candidate key points corresponding to the collection of comments using a machine learning model.

7. The method of claim 1, generating the summary such that the summary links each key point with the comments that were mapped to the key point.

8. A computing system, comprising:
   an interface for receiving a collection of comments;
   a processor; and
   a computer-readable storage medium storing program instructions that direct the processor to:
      identify a set of candidate key points corresponding to the collection of comments;
      select a subset of key points from the set of candidate key points, wherein the selected subset of key points comprises key points that are most salient in the collection of comments;
      automatically map each comment within the collection of comments to any corresponding key points within the subset of key points based on a match score between each comment and key point pair; and
      generate a summary comprising the subset of key points and an absolute number or percentage of the comments mapped to each key point.

9. The computing system of claim 8, wherein the computer-readable storage medium stores program instructions that direct the processor to select the subset of key points from the set of candidate key points by:
   automatically mapping each comment within the collection of comments to any corresponding candidate key points based on a match score between each comment and candidate key point pair;
   automatically mapping each candidate key point to any other corresponding candidate key points based on a match score between each candidate key point pair;
   ranking the candidate key points in descending order according to a number of comments mapped to each candidate key point;
   removing any candidate key points that are mapped to a higher-ranking candidate key point if the match score between the candidate key point pair is above a specified threshold;
   automatically mapping removed candidate key points and comments that were mapped to a removed candidate key point to any corresponding remaining candidate key points based on a match score between each comment or removed candidate key point and remaining candidate key point pair;
   ranking the remaining candidate key points in descending order according to an updated number of comments mapped to each remaining candidate key point; and
   selecting a specified number of highest-ranking remaining candidate key points as the subset of key points that are most salient in the collection of comments.

10. The computing system of claim 8, wherein the computer-readable storage medium stores program instructions that direct the processor to automatically map each comment within the collection of comments to any corresponding key points within the subset of key points by:
  determining the match score between each comment and key point pair using a matcher machine learning model; and
  mapping each comment to any corresponding key points based on the match score using a specified selection policy.

11. The computing system of claim 10, wherein the computer-readable storage medium stores program instructions that direct the processor to generate the matcher machine learning model based on at least one of a supervised machine learning technique, an unsupervised machine learning technique, or a natural language inference technique.

12. The computing system of claim 10, wherein the specified selection policy comprises a best match plus threshold selection policy, and wherein the computer-readable storage medium stores program instructions that direct the processor to use the best match plus threshold selection policy to map each comment to any corresponding key points by mapping each comment to a key point with a highest match score, as long as the match score is above a specified threshold.

13. The computing system of claim 8, wherein the computer-readable storage medium stores program instructions that direct the processor to automatically identify the set of candidate key points corresponding to the collection of comments using a machine learning model.

14. The computing system of claim 8, wherein the computer-readable storage medium stores program instructions that direct the processor to generate the summary such that the summary links each key point with the comments that were mapped to the key point.

15. The computing system of claim 8, wherein the domain comprises a debate/argumentation domain, a survey domain, a user review or customer feedback domain, a call transcript domain, or an online discussion forum domain.

16. A computer program product, comprising a computer-readable storage medium having program instructions embodied therewith, wherein the computer-readable storage medium is not a transitory signal per se, and wherein the program instructions are executable by a processor to cause the processor to:
  access a collection of comments;
  identify a set of candidate key points corresponding to the collection of comments;
  select a subset of key points from the set of candidate key points, wherein the selected subset of key points comprises key points that are most salient in the collection of comments;
  automatically map each comment within the collection of comments to any corresponding key points within the subset of key points based on a match score between each comment and key point pair; and
  generate a summary comprising the subset of key points and an absolute number or percentage of the comments mapped to each key point.

17. The computer program product of claim 16, wherein the program instructions are executable by the processor to cause the processor to select the subset of key points from the set of candidate key points by:
  automatically mapping each comment within the collection of comments to any corresponding candidate key points based on a match score between each comment and candidate key point pair;
  automatically mapping each candidate key point to any other corresponding candidate key points based on a match score between each candidate key point pair;
  ranking the candidate key points in descending order according to a number of comments mapped to each candidate key point;
  removing any candidate key points that are mapped to a higher-ranking candidate key point if the match score between the candidate key point pair is above a specified threshold;
  automatically mapping removed candidate key points and comments that were mapped to a removed candidate key point to any corresponding remaining candidate key points based on a match score between each comment or removed candidate key point and remaining candidate key point pair;
  ranking the remaining candidate key points in descending order according to an updated number of comments mapped to each remaining candidate key point; and
  selecting a specified number of highest-ranking remaining candidate key points as the subset of key points that are most salient in the collection of comments.

18. The computer program production of claim 16, wherein the program instructions are executable by the processor to cause the processor to automatically map each comment within the collection of comments to any corresponding key points within the subset of key points by:
  determining the match score between each comment and key point pair using a matcher machine learning model; and
  mapping each comment to any corresponding key points based on the match score using a specified selection policy.

19. The computer program production of claim 16 wherein the specified selection policy comprises a best match plus threshold selection policy, and wherein the program instructions are executable by the processor to cause the processor to use the best match plus threshold selection policy to map each comment to any corresponding key points by mapping each comment to a key point with a highest match score, as long as the match score is above a specified threshold.

20. The computer program production of claim 16, wherein the program instructions are executable by the processor to cause the processor to generate the summary such that the summary links each key point with the comments that were mapped to the key point.

* * * * *